A. WERNER.
SYSTEM OF BOOSTING ELECTRIC LINES.
APPLICATION FILED NOV. 25, 1913. RENEWED NOV. 2, 1918.
1,304,132.
Patented May 20, 1919.
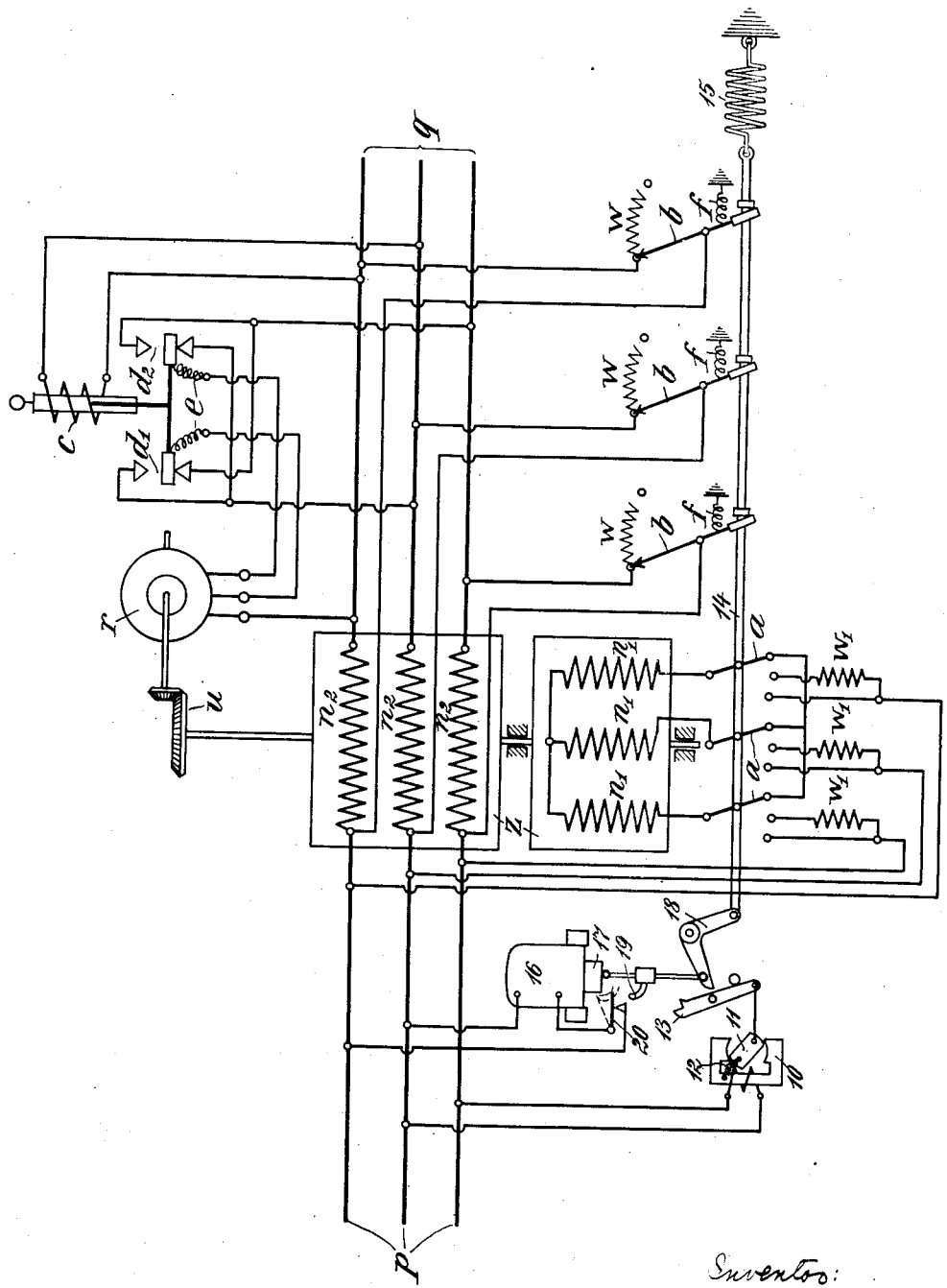

UNITED STATES PATENT OFFICE.

ALBERT WERNER, OF BERLIN-FRIEDENAU, GERMANY, ASSIGNOR TO SIEMENS-SCHUCKERTWERKE, G. M. B. H., OF BERLIN, GERMANY, A CORPORATION OF GERMANY.

SYSTEM OF BOOSTING ELECTRIC LINES.

1,304,132.   Specification of Letters Patent.   Patented May 20, 1919.

Application filed November 25, 1913, Serial No. 802,946. Renewed November 2, 1918. Serial No. 260,917.

*To all whom it may concern:*

Be it known that I, ALBERT WERNER, a German citizen, and resident of Berlin-Friedenau, Germany, have invented certain new and useful Improvements in Systems of Boosting Electric Lines, of which the following is a specification.

This invention relates to a system of booster transformers for boosting electric distributing lines and consists in brief in shortcircuiting the series windings of such booster transformers when being switched off, and in gradually opening the shortcircuit after the exciting winding has again been automatically switched into circuit.

The object of my present invention is primarily to avoid a surplus of boosting voltage in case of booster transformers which are automatically switched into circuit and regulated.

In electrical distributing lines regulable booster transformers are employed, whose primary windings are connected in shunt to the line voltage and whose secondary windings are switched in series with the consumption circuit. The boosting voltage of the series windings can be varied in amount or as regards its phase-value, within definite limits, in order, for instance, to maintain the voltage in the consumption circuit of the distributing line constant. For this purpose voltmeters, relays or similar apparatus are provided in the consumption circuit, which vary the voltage of the series winding or its phase in the desired manner.

In such distributing lines the fact must be taken care of that the distributing voltage will be switched off and after some time again be switched into circuit. In case this voltage before being switched off has been of a smaller value, the booster transformer on account of its automatic regulating features will have been giving a high booster voltage, and when disconnecting said voltage, the booster transformer will remain in this position. If, however, the line voltage has increased in value during the time until it is again connected to the line, then, if no further provisions were made, the high voltage of the booster transformer would add to the voltage of the line and thereby cause an impermissible high consumption voltage. In order to avoid this disadvantage the booster transformer in case of failing of the line voltage is automatically switched out of circuit.

Another mode of operation employed in practice consists therein that after the line voltage has reappeared the booster transformer before being again connected to the voltage is automatically adjusted upon the smallest booster voltage. This method, as all operations have to be done automatically, requires complicated switching and regulating apparatus.

By my present invention I avoid an excess of booster voltage in the moment of switching the booster transformer again into circuit by suppressing for some time the transformer action and therewith the booster effect of the apparatus. For this purpose according to my invention the secondary or series winding of the booster transformer is short-circuited in steps and the primary winding is short-circuited and connected in steps to the line voltage.

In the drawing I have shown as an example a mode of connections according to my present invention. The booster transformer $z$ with its series windings or secondaries $n_2$ inserted into single conductors $p$ of the consumption circuit $q$ is provided with an exciting or primary winding $n_1$ which is connected over the automatic step-by-step switch $a$ to the mains $p$ in the line. The voltage in the consumption circuit $q$ is kept at a constant value by the regulation of the booster transformer which is controlled by a voltage relay $c$ connected to the mains $q$ and a motor $r$ which changes the relative position between primary and secondary windings of the booster transformer by means of the gear $u$ as indicated in the drawing. Thus if the voltage between any pair of line conductors $p$ be decreasing in value, the motor $r$ will be operated in one direction and therewith change the angular position of the booster transformer to result into a greater boosting effect; or if the voltage between the conductors $p$ be increasing the relay $c$ will cause the motor $r$ to operate in reverse direction and change the relative position between primary and secondary of the booster transformer to result into a smaller booster voltage. The reversal of the motor $r$ which is shown as being a three-phase induction motor, is effected by changing the connections of two of the conductors leading to the motor, as clearly represented in the drawing by the contacts $d_1$ and $d_2$ operated by the relay $c$ in one direction and the springs $e$ in the other direction.

In parallel to the series windings $n_2$ the resistances $w$ may be inserted or a short-circuit may be made thereto by means of the switches $b$. In the outermost position of the switching contacts on the left side of the resistances $w$ the series windings are short-circuited, in the outermost position on the right side, the shunt is opened, while in any intermediate position a corresponding part of the resistances $w$ is switched in parallel to the secondary windings $n_2$ of the booster transformer $z$. The switches $b$ are provided with a spring $f$, as shown in the drawing, which tends to move said switches into position to make a short-circuit to the windings $n_2$, while a further automatic device is employed to move these switches into the position to include the resistanaces $w$, as more fully described below.

The triple-pole, triple-throw switch $a$ disconnects the booster transformer automatically from the line in case the line voltage be failing. In this case by means of the switches $b$ the short-circuit must be established, which may be done by said springs $f$. If the switch $a$ be again closed, which is done automatically by another relaying mechanism below more fully described, in the moment of the re-appearance of the line voltage, also the switches $b$ will again be moved toward the right and the short-circuit of the windings $n_2$ will gradually be removed so that the relay $c$ and motor $r$ will have time to adjust the booster transformer $z$ upon the proper booster voltage. Simultaneously with this operation of the switches $b$ the primary winding $n_1$ will first be switched over resistances $w_1$ and then directly connected to the line. After the switches $b$ have included considerable parts of the resistances $w$ into the short-circuit, impermissibly high short-circuit currents can apparently no more take place in the booster transformer.

The automatic apparatus for operating in proper dependence upon the line voltage the switches $b$ and $a$ consists in the first place of a relay 10, inserted between two conductors $p$ of the line $q$, which relay at normal operating line voltage will adjust its armature 11 so as to be in the line of its poles, while in case of failing line voltage the armature 11 will be drawn by the spring 12 into a position out of the pole-line as shown in the drawing, thereby moving a stop-lever 13 out of locking position for the mechanism for the second part of said automatic apparatus. This second part consists of a shaft 14 which during inoperative position of the lever 13 will be drawn into the position as represented, by action of the spring 15, thereby short-circuiting the primary winding $n_1$ and at the same time the secondary $n_2$. In the normal operating position the left end of the lever 18 is engaged by the recess on the outer end of the lever 13 and is thus kept in position, so that upon failing of the line voltage by action of the spring 12 the armature 11 of the relay is rotated and thereby the upper end of the lever 13 will be moved toward the left. In this manner the lever 18 will be released and by reason of the power of the spring 15 the rod 14 will be moved toward the right. A relay 16 is connected between two mains $q$, serving to gradually reëstablish the connections which were existing in the moment of failure of the line voltage, that is to say, to move the switch $a$ toward the left, thereby first including the resistances $w_1$ thereupon directly connecting the primary $n_1$ of the boosting transformer to the mains $q$ and simultaneously with these operations to switch first resistances $w$ into parallel with the secondaries $n_2$ and thereupon also to open the resistance circuit $w$ for removing the shunt for the secondary.

The relay mechanism 16 operates the plunger 17 and therewith pulls the bell crank 18 into a position for directly connecting the primary $n_1$ to line and simultaneously inserts resistance in shunt to the secondary $n_2$ and $w$. After the bell crank 18 has been operated by the relay mechanism 16 a stop 19 will interrupt the operating circuit for said relay 16 by opening said circuit at 20.

Having thus described my invention I wish to claim as new and desire to secure by Letters Patent of the United States:—

1. In combination with an alternating current line, a booster, means controlled by a voltage variation of said line for changing the boosting effect of said booster, and preventive means applied to the windings of said booster and controlled from a failing of the supply voltage of said line for preventing said booster from impressing the voltage corresponding to its condition at the moment of the failing of the supply voltage, upon the reappearance of the supply voltage.

2. In combination with an alternating current line, a booster transformer having a primary winding excited in shunt to said line voltage and a secondary winding inserted in series into the conductors of said line, means for changing the boosting effect of said transformer controlled from a voltage which is below or above normal, a variable resistance device and switching instrumentalities adapted to be actuated by a failing of the supply voltage of said line for cutting-out resistance in steps in parallel with said secondary winding and short-circuiting said primary winding, and means adapted to be actuated by the supply voltage when reappearing for switching said resistance gradually into the shunt of said secondary winding and thereupon open said shunt circuit and for simultaneously connecting said primary winding first over resistances and then directly to said line.

3. In combination with an alternating current line, a booster transformer, adjusting means controlled from a voltage of said line which is below or above normal for changing the boosting effect of said transformer, preventive means controlled by a failure of the supply voltage of said line for preventing said transformer from producing an improper boosting voltage in case of the reappearance of said supply voltage, said preventive means being adapted to operate immediately upon failure of said line voltage and permitting said adjusting means to come into action in due time for properly adjusting the boosting effect of said transformer upon the voltage of said line.

4. In combination with an alternating current line, a booster transformer having its primary supplied by the voltage of said line and its secondary inserted in series into said line, motor-means controlled from a voltage of said line which is differing from normal for changing the relative position between said primary and said secondary, and switching instrumentalities controlled by a failure of supply voltage for short-circuiting said secondary winding, said switching instrumentalities being further adapted to gradually remove the short-circuit to said series windings in order to enable said first mentioned motor-means to come into action some time after the reappearance of the line voltage for properly adjusting the boosting voltage to its correct value and for preventing improper voltages from being impressed upon said line.

5. In combination with an alternating current line, a booster transformer, means for varying the boosting effect of said transformer controlled from a variation below or above normal of said line voltage, preventive means adapted to short-circuit in steps the windings of said transformer in case of a lack of said supply voltage, and mechanism for removing the short-circuits for said windings controlled by the reappearance of said line voltage, said mechanism being adapted to come into action in case of said re-appearance of said voltage and before said means for changing the boosting effect have time to adjust themselves upon the momentary voltage of said line.

In witness whereof I have hereunto set my signature in the presence of two subscribing witnesses.

ALBERT WERNER.

Witnesses:
  WOLDEMAR HAUPT,
  HENRY HASPER.